US012240019B2

(12) United States Patent
McGuire et al.

(10) Patent No.: US 12,240,019 B2
(45) Date of Patent: Mar. 4, 2025

(54) APPARATUS FOR CLEANING A SURFACE WITH A LIQUID JET AND RELATED METHODS

(71) Applicant: Path Environmental Technology, LLC, Houston, TX (US)

(72) Inventors: Adam McGuire, The Woodlands, TX (US); Robert O'Brien, Katy, TX (US)

( * ) Notice: Subject to any disclaimer, the term of this patent is extended or adjusted under 35 U.S.C. 154(b) by 440 days.

(21) Appl. No.: 17/848,949

(22) Filed: Jun. 24, 2022

(65) Prior Publication Data

US 2022/0410229 A1 Dec. 29, 2022

Related U.S. Application Data

(60) Provisional application No. 63/280,447, filed on Nov. 17, 2021, provisional application No. 63/214,759, filed on Jun. 24, 2021.

(51) Int. Cl.
*B08B 9/04* (2006.01)
*B05B 1/10* (2006.01)
(Continued)

(52) U.S. Cl.
CPC ................ *B08B 9/047* (2013.01); *B05B 1/10* (2013.01); *B05B 15/652* (2018.02); *B05B 15/72* (2018.02);
(Continued)

(58) Field of Classification Search
CPC ......... B08B 9/047; B08B 3/04; B08B 9/0495; B08B 9/093; B08B 13/00; B08B 2209/08; B05B 15/72; B05B 15/652; B05B 1/10
(Continued)

(56) References Cited

U.S. PATENT DOCUMENTS

2016/0129486 A1* 5/2016 Bauer .................... H04N 23/54
134/167 C

* cited by examiner

*Primary Examiner* — Tinsae B Ayalew

(57) ABSTRACT

Apparatus for cleaning a surface with a liquid jet, the apparatus having: a primary fluid conduit having a longitudinal axis and two ends, a fluid-intake end and a fluid-exit end; a first motor-driven drive assembly configured to engage the primary fluid conduit and turn the primary fluid conduit about the primary-fluid-conduit longitudinal axis; a first motor configured to engage the first motor-driven drive assembly; a section of the primary fluid conduit being inside of an adjacent penetration sleeve; a section of the penetration sleeve being inside of a piston sleeve; the piston sleeve configured to engage the penetration sleeve and move the penetration sleeve back and forth along a penetration-sleeve linear path over a primary-fluid-conduit exterior surface; an actuator configured to engage the piston sleeve and move piston sleeve back and forth along a piston-sleeve linear path; a penetration-sleeve end being attached to an extension sleeve that has a first end and a second end; the extension-sleeve second end being attached to a pull rod or a pull cable; the pull rod or the pull cable being attached to a nozzle anchor and configured to pull on, push against, or release tension from the nozzle anchor as the penetration sleeve moves back and forth along the penetration-sleeve linear path; the primary-fluid-conduit fluid-exit end being attached to a flexible conduit; the flexible conduit being attached to a nozzle tip having the nozzle anchor thereon; and a continuous fluid-flow channel that extends from the primary-fluid-conduit fluid-intake end through the flexible conduit.

10 Claims, 12 Drawing Sheets

(51) Int. Cl.

| | |
|---|---|
| ***B05B 15/652*** | (2018.01) |
| ***B05B 15/72*** | (2018.01) |
| ***B08B 3/04*** | (2006.01) |
| ***B08B 9/047*** | (2006.01) |
| ***B08B 9/049*** | (2006.01) |
| ***B08B 9/093*** | (2006.01) |
| ***B08B 13/00*** | (2006.01) |

(52) U.S. Cl.
CPC .............. *B08B 3/04* (2013.01); *B08B 9/0495* (2013.01); *B08B 9/093* (2013.01); *B08B 13/00* (2013.01); *B08B 2209/08* (2013.01)

(58) Field of Classification Search
USPC ........................................................ 134/56 R
See application file for complete search history.

APPARATUS FOR CLEANING A SURFACE WITH A LIQUID JET AND RELATED METHODS

CROSS-REFERENCE TO RELATED APPLICATIONS

This patent application claims priority to U.S. provisional patent application 63/280,447 filed on Nov. 17, 2021; the subject matter of which is incorporated into this application in its entirety.

This patent application also claims priority to U.S. provisional patent application 63/214,759 filed on Jun. 24, 2021; the subject matter of which is incorporated into this application in its entirety.

BACKGROUND OF THE INVENTION

Storage tanks, such as those used to store crude oil or other carbon-containing fluids, are well known. There remains a need for an apparatus that can be used to clean the interior walls of storage tanks that are used to store crude oil or other carbon-containing fluids.

BRIEF SUMMARY OF THE INVENTION

Apparatus for cleaning a surface with a liquid jet, the apparatus having: a primary fluid conduit having a longitudinal axis and two ends, a fluid-intake end and a fluid-exit end; a first motor-driven drive assembly configured to engage the primary fluid conduit and turn the primary fluid conduit about the primary-fluid-conduit longitudinal axis; a first motor configured to engage the first motor-driven drive assembly; a section of the primary fluid conduit being inside of an adjacent penetration sleeve; a section of the penetration sleeve being inside of a piston sleeve; the piston sleeve configured to engage the penetration sleeve and move the penetration sleeve back and forth along a penetration-sleeve linear path over a primary-fluid-conduit exterior surface; an actuator configured to engage the piston sleeve and move piston sleeve back and forth along a piston-sleeve linear path; a penetration-sleeve end being attached to an extension sleeve that has a first end and a second end; the extension-sleeve second end being attached to a pull rod or a pull cable; the pull rod or the pull cable being attached to a nozzle anchor and configured to pull on, push against, or release tension from the nozzle anchor as the penetration sleeve moves back and forth along the penetration-sleeve linear path; the primary-fluid-conduit fluid-exit end being attached to a flexible conduit; the flexible conduit being attached to a nozzle tip having the nozzle anchor thereon; and a continuous fluid-flow channel that extends from the primary-fluid-conduit fluid-intake end through the flexible conduit.

DETAILED DESCRIPTION OF THE INVENTION

Figure 1:
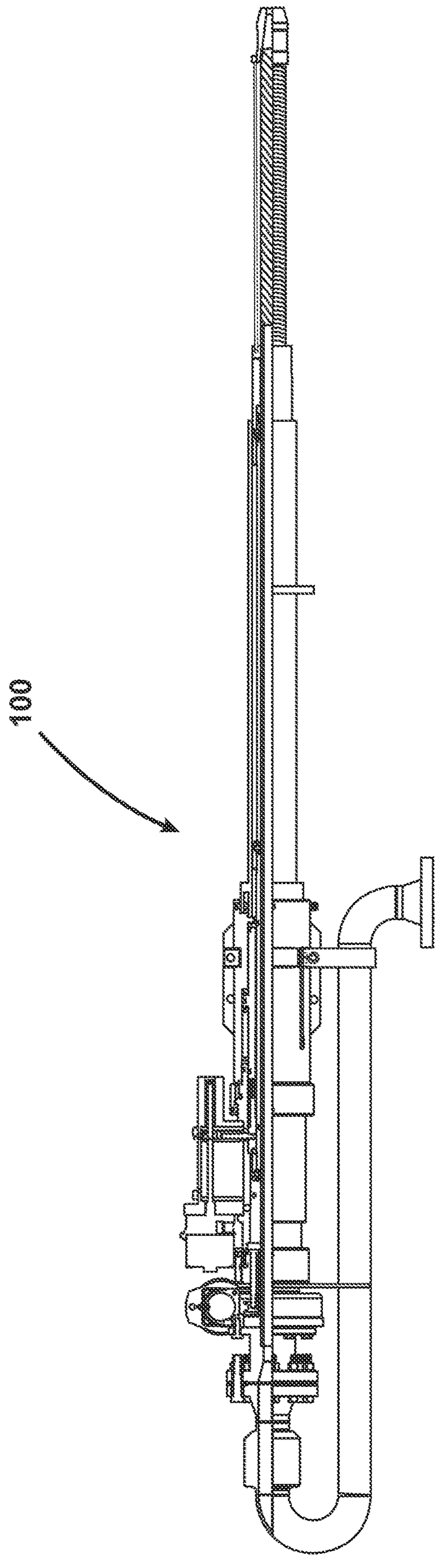
FIG. 1 is a side partial cross-sectional view of an embodiment.
Figure 2:
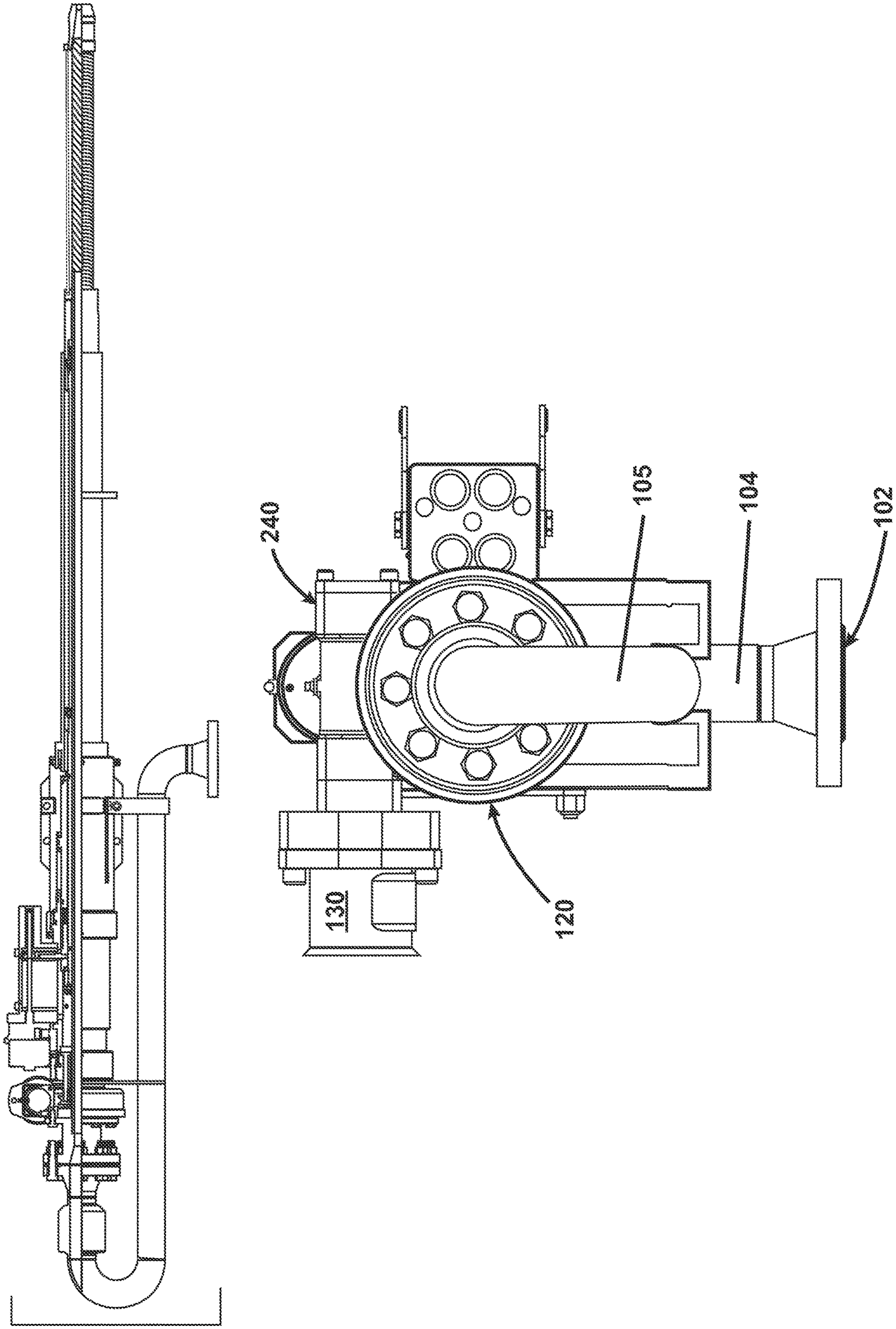
FIG. 2 is an end view of an embodiment.
Figure 3:
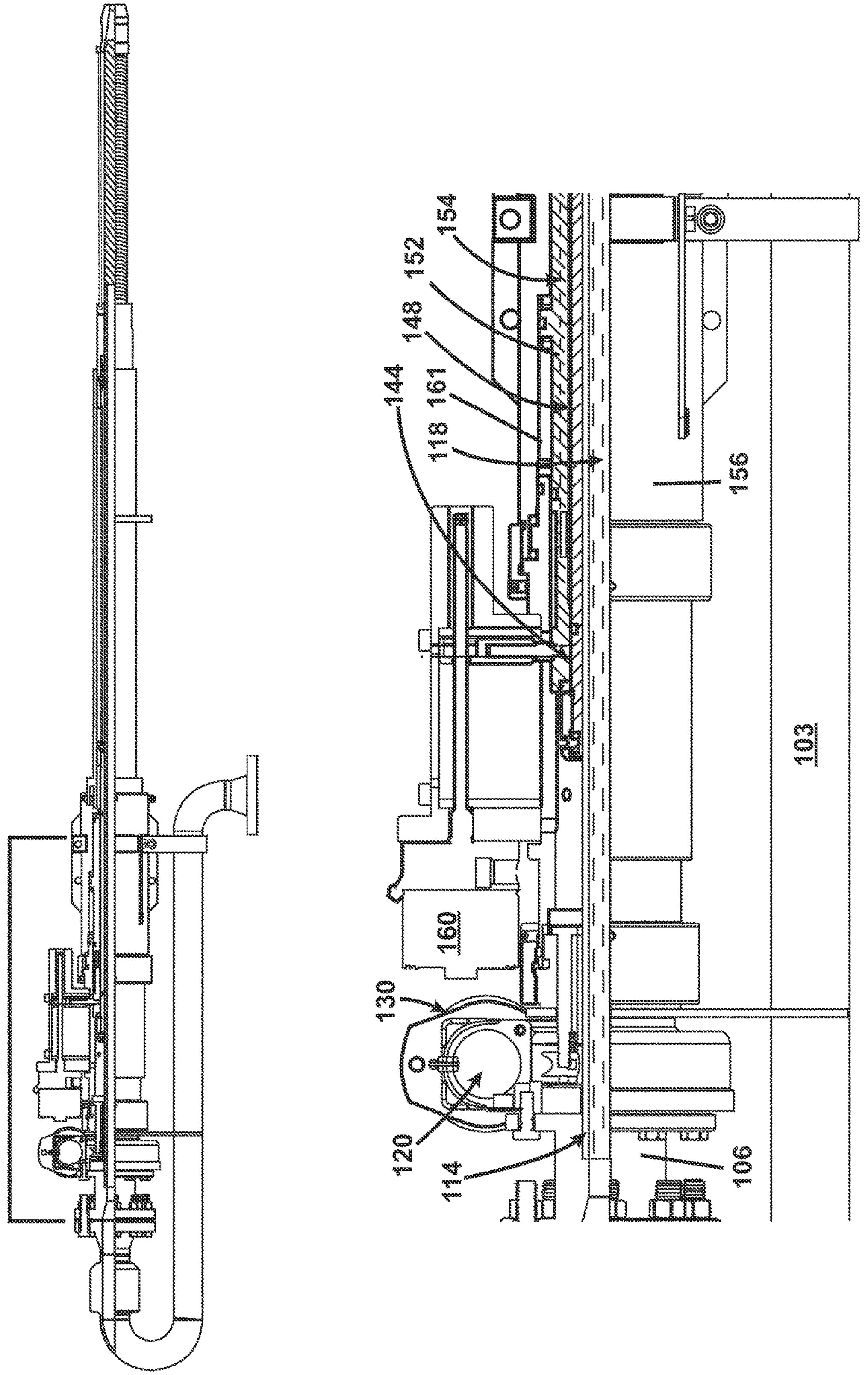
FIG. 3 is a side partial cross-sectional view of an embodiment.
Figure 4:
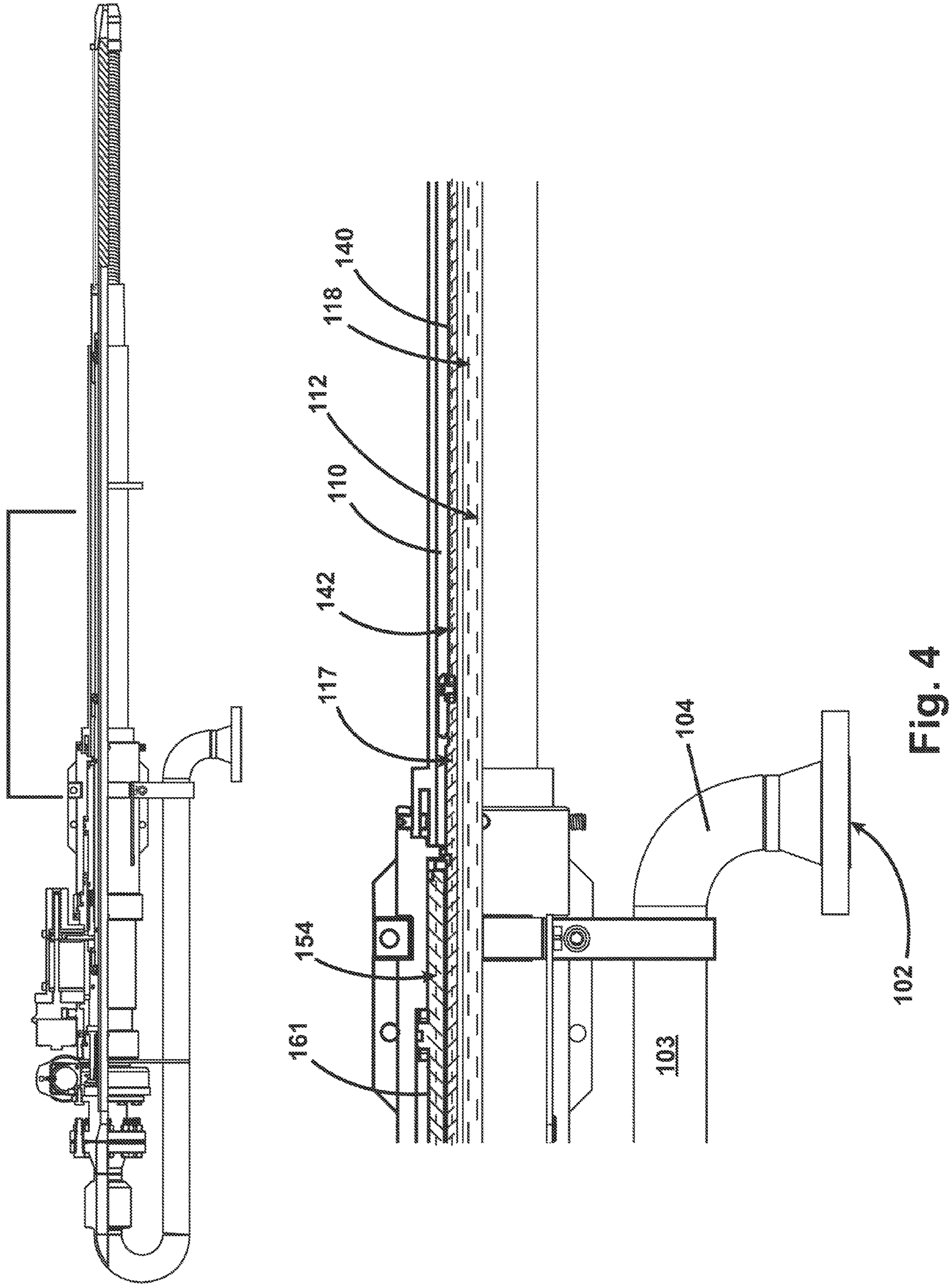
FIG. 4 is a side partial cross-sectional view of an embodiment.
Figure 5:
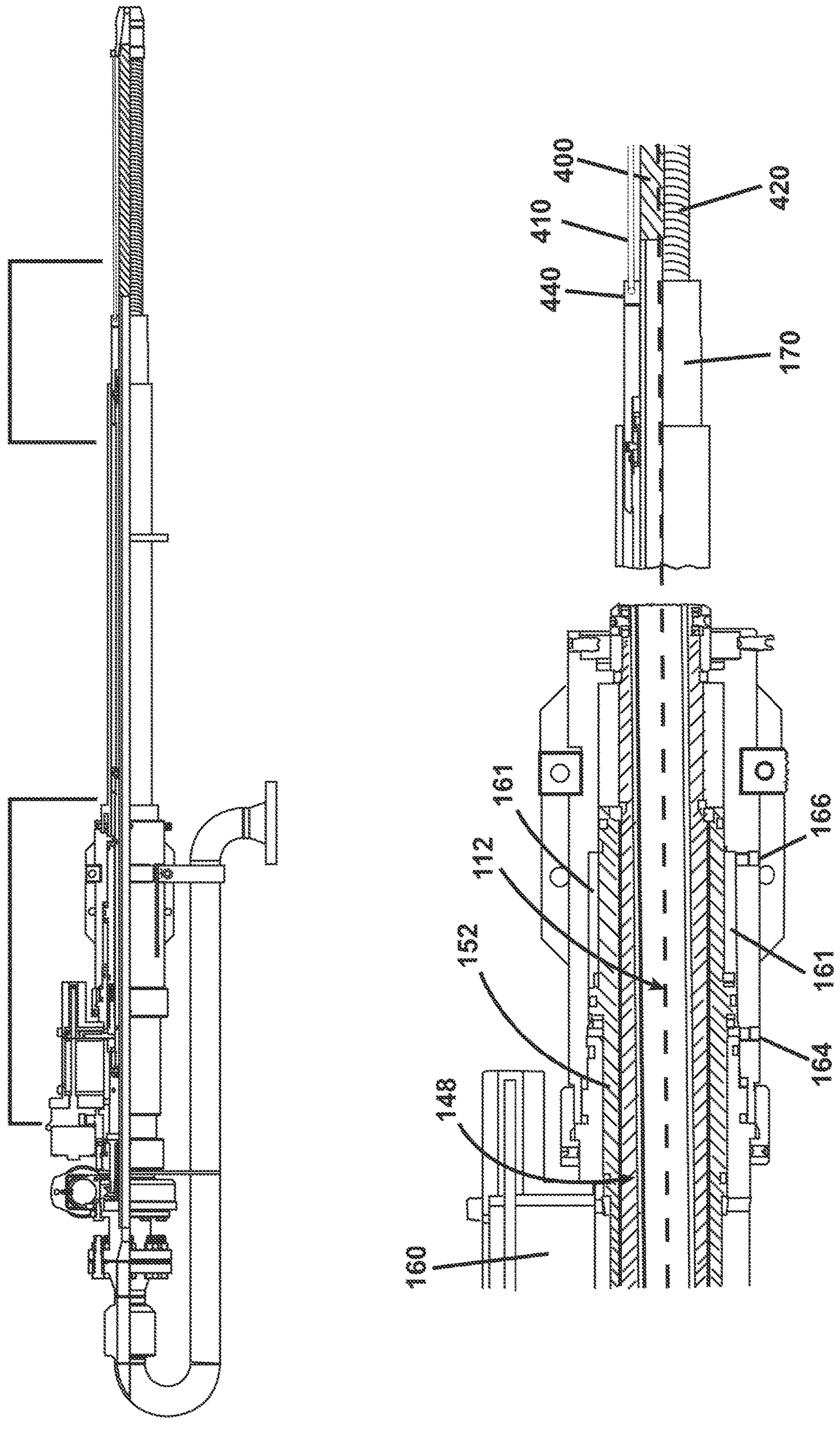
FIG. 5 is a side partial cross-sectional view of an embodiment.
Figure 6:
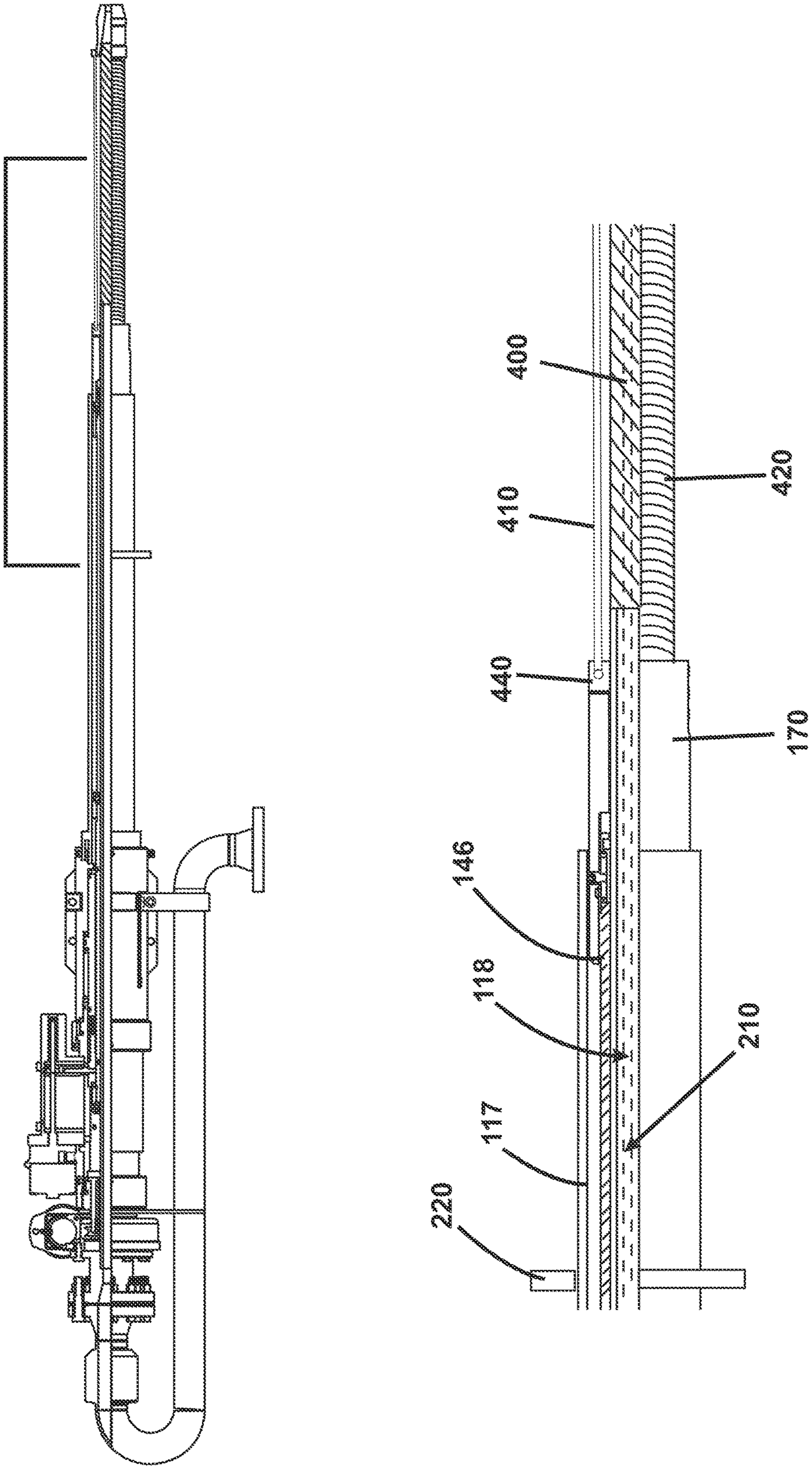
FIG. 6 is a side partial cross-sectional view of an embodiment.

Embodiments are generally directed to an apparatus configured to receive pressurized fluid from an outside source and subsequently discharge it as a pressurized liquid jet that can be used to clean a surface by blasting unwanted debris off of the soiled surface. Very generally, after receiving the incoming pressurized fluid through an initial fluid-intake port, the fluid then travels within the apparatus along a fluid-flow path to a nozzle tip having an exit orifice from which the fluid is discharged as a pressurized liquid jet. And although, in embodiments, the main body of the apparatus remains in a fixed mounted position while in use, the apparatus is configured to allow a user to use a remote control to move and thereby aim the nozzle tip in a variety of directions in three-dimensional space to facilitate directing the exiting pressurized liquid jet at a variety of surface target areas.

With reference to the figures, apparatus 100 has initial fluid-intake port 102 that is configured to serve as apparatus 100's port of entry for receiving pressurized fluid originating from an outside source such as a fluid pump. Initial fluid-intake port 102 is fixedly attached to initial fluid-intake conduit 103 at initial fluid-intake conduit first end 104. At initial fluid-intake conduit 103's other end, i.e., at initial fluid-intake conduit second end 105, initial fluid-intake conduit 103 is fixedly and non-movably attached to swivel adaptor 106. Although swivel adaptor 106 is fixedly and non-movably attached to initial fluid-intake conduit second end 105 (to receive fluid flow therefrom), on its other side, as shown in the figures, swivel adaptor 106 is configured to receive primary fluid conduit 110's primary-fluid-conduit fluid-intake end 114 such that that primary-fluid-conduit fluid-intake end 114 is inset into and fixedly attached to swivel adaptor 106. This connection configuration allows fluid flow to travel from initial fluid-intake conduit second end 105, through swivel adaptor 106, into primary-fluid-conduit fluid-intake end 114, through primary fluid conduit 110, and out of primary-fluid-conduit fluid-exit end 116. As will be described further below, fluid flow then continues from primary-fluid-conduit fluid-exit end 116, into and through flexible conduit 400, and finally out of nozzle tip 260 as a pressurized fluid jet.

In embodiments, the above fluid-flow path can be understood to be within continuous fluid-flow channel 210.

To control the degree of turning of nozzle tip 260 about primary-fluid-conduit longitudinal axis 112 and thereby allow a user to remote controllably aim nozzle tip 260 (and the pressurized liquid jet emitted therefrom) at a target surface, the following mechanical-configuration explanation of apparatus 100 is provided.

A portion of swivel adaptor 106, that is fixedly attached to primary-fluid-conduit fluid-intake end 114 is configured to swivel or spin freely in a first or second direction about primary-fluid-conduit longitudinal axis 112 and thereby allow the fixedly attached primary fluid conduit 110 to also swivel or spin freely, in an equal degree, in a first or second direction about primary-fluid-conduit longitudinal axis 112. Stated differently, because primary-fluid-conduit fluid-intake end 114 is fixedly inset into swivel adaptor 106, as swivel adaptor 106 swivels or spins in one direction or the other about primary-fluid-conduit longitudinal axis 112, primary fluid conduit 110 also swivels or spins about primary-fluid-conduit longitudinal axis 112 to the same degree (as swivel adaptor 106) because the two are fixedly attached to one another and swivel or spin together as a single unit.

To controllably turn primary fluid conduit 110 any number of degrees in a first or second direction about primary-fluid-conduit longitudinal axis 112, the turning action of primary fluid conduit 110 (about primary-fluid-conduit longitudinal axis 112) is motor driven by first motor 130 and first motor-driven drive assembly 120 working in coordination. First motor 130 is configured to engage first motor-driven drive assembly 120, and motor-driven drive assembly 120 is configured to engage and thereby turn primary fluid conduit 110 any number of degrees in a first or second direction about primary-fluid-conduit longitudinal axis 112. The turning action of primary fluid conduit 110 about primary-fluid-conduit longitudinal axis 112 is reversible.

Figure 12:
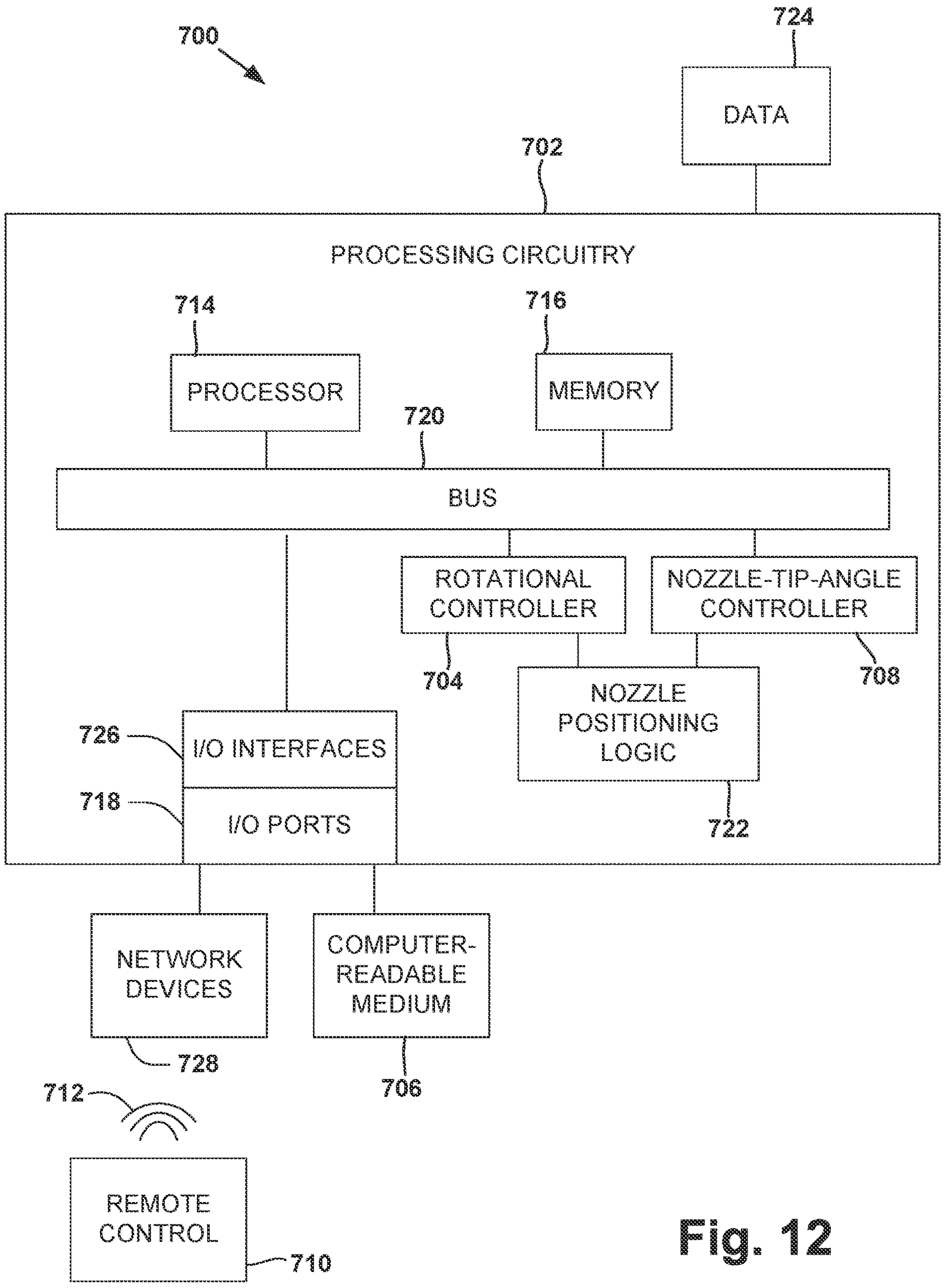
FIG. 12 is an embodiment of processing circuitry implemented as a computing system including electronic circuitry and a non-transitory, computer-readable medium storing executable logic of a rotational controller and a nozzle-tip-angle controller, according to the exemplary systems and/or methods disclosed.

As a non-limiting example, primary fluid conduit 110 can be controllably engaged to turn 5° in a first direction (and thereby aim nozzle tip 260 and a pressurized liquid jet emitted therefrom) and then controllably be made to remain in that position for any period of time as desired by a user (in an effort to clean debris off of a target surface using the pressurized liquid jet emitted from the nozzle tip). Then, if a user decides that primary fluid conduit 110 and the liquid jet emitted from nozzle tip 260 should be turned back −10° (i.e., in an opposite direction to target debris that may have been missed) and keep the primary fluid conduit 110 in that position for a desired period of time (again to clean debris off of a target surface), then a user can controllably do so by using a remote control 710 (FIG. 12), optionally over a wireless communication channel 712 (FIG. 12).

First motor 130 can be any known type of motor, and in embodiments, useful motors include a hydraulic, pneumatic, or electric motor(s). Due to the configuration of first motor 130 and first motor-driven drive assembly 120 with one another, when first motor 130 is remotely activated by a user (using a remote control), first motor 130 engages first motor-driven drive assembly 120, that in embodiments includes a gear box (not shown), to thereby cause primary fluid conduit 110 to turn any number of degrees in a first or second direction about primary-fluid-conduit longitudinal axis 112. In embodiments, primary fluid conduit 110 can turn continuously in a first or second direction, and in embodiments, primary fluid conduit 110 can be turned continuously any number of degrees in a first direction about primary-fluid-conduit longitudinal axis 112 and then subsequently turned continuously any number of degrees in the opposite or second direction about primary-fluid-conduit longitudinal axis 112. That is to say that the directionality of the turning action of primary fluid conduit 110 is reversible; for example, primary fluid conduit 110 can be turned in a first direction any number of degrees, and then if a user provides input into a remote control to do so, primary fluid conduit 110 can be made to reverse direction and turn in an opposite second direction any number of degrees.

The purpose of causing primary fluid conduit 110 to turn any number of degrees in a first or second direction about primary-fluid-conduit longitudinal axis 112 is that, as shown in the figures, nozzle tip 260 is indirectly mechanically attached to primary fluid conduit 110, and as primary fluid conduit 110 turns in a first or second direction about primary-fluid-conduit longitudinal axis 112, so does nozzle tip 260 to an equal degree. This is what allows a user to controllably turn nozzle tip 260 any number of degrees in one direction or another about primary-fluid-conduit longitudinal axis 112; in other words, this is how a user can turn and thereby aim nozzle tip 260 (and the pressurized liquid jet emitted therefrom) at a target surface. The purpose of controllably turning primary fluid conduit 110 is to give a user control over the directionality of a pressurized liquid jet being emitted from nozzle tip 260.

Figure 7:
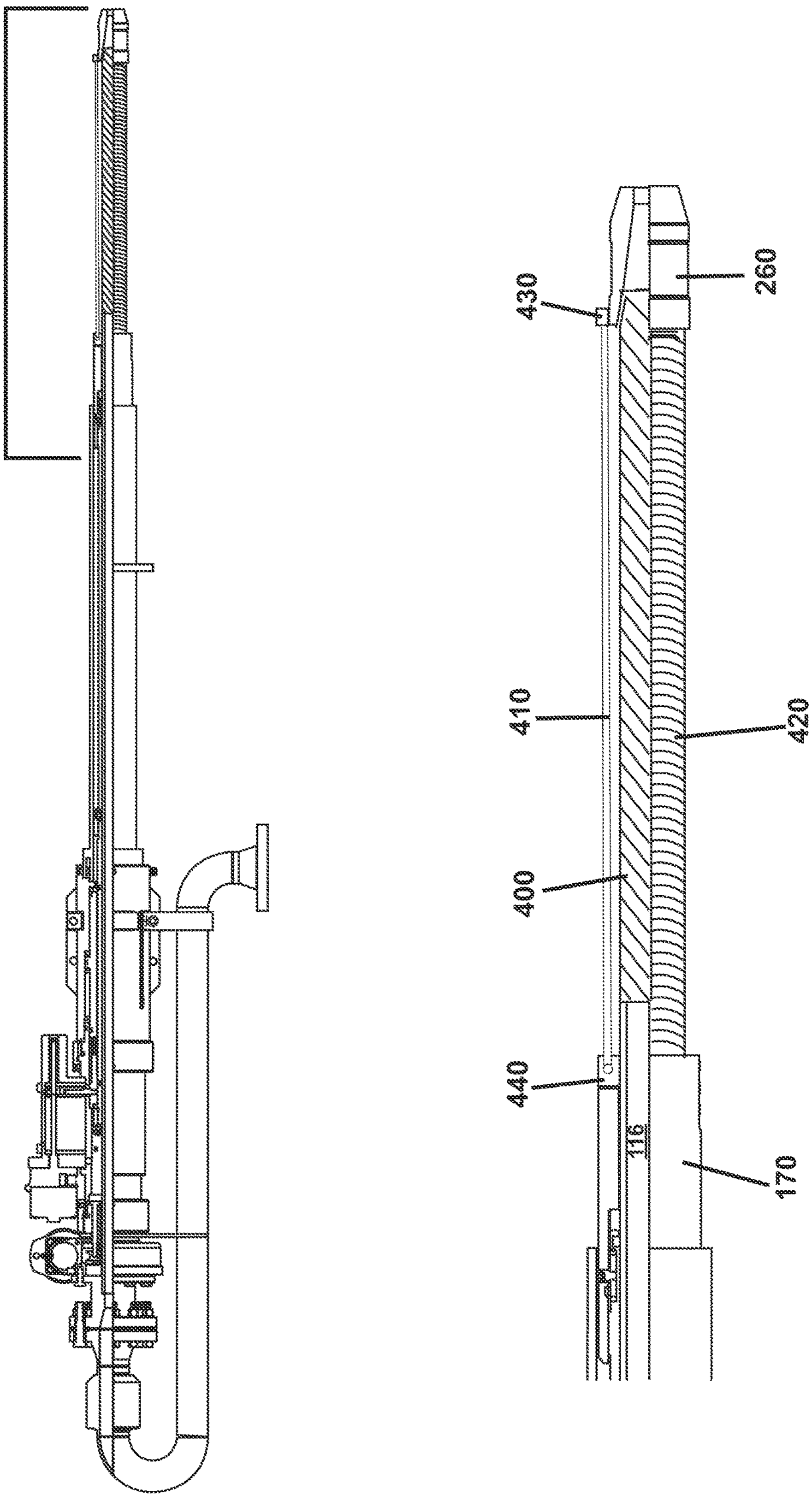
FIG. 7 is a side partial cross-sectional view of an embodiment.
Figure 8:
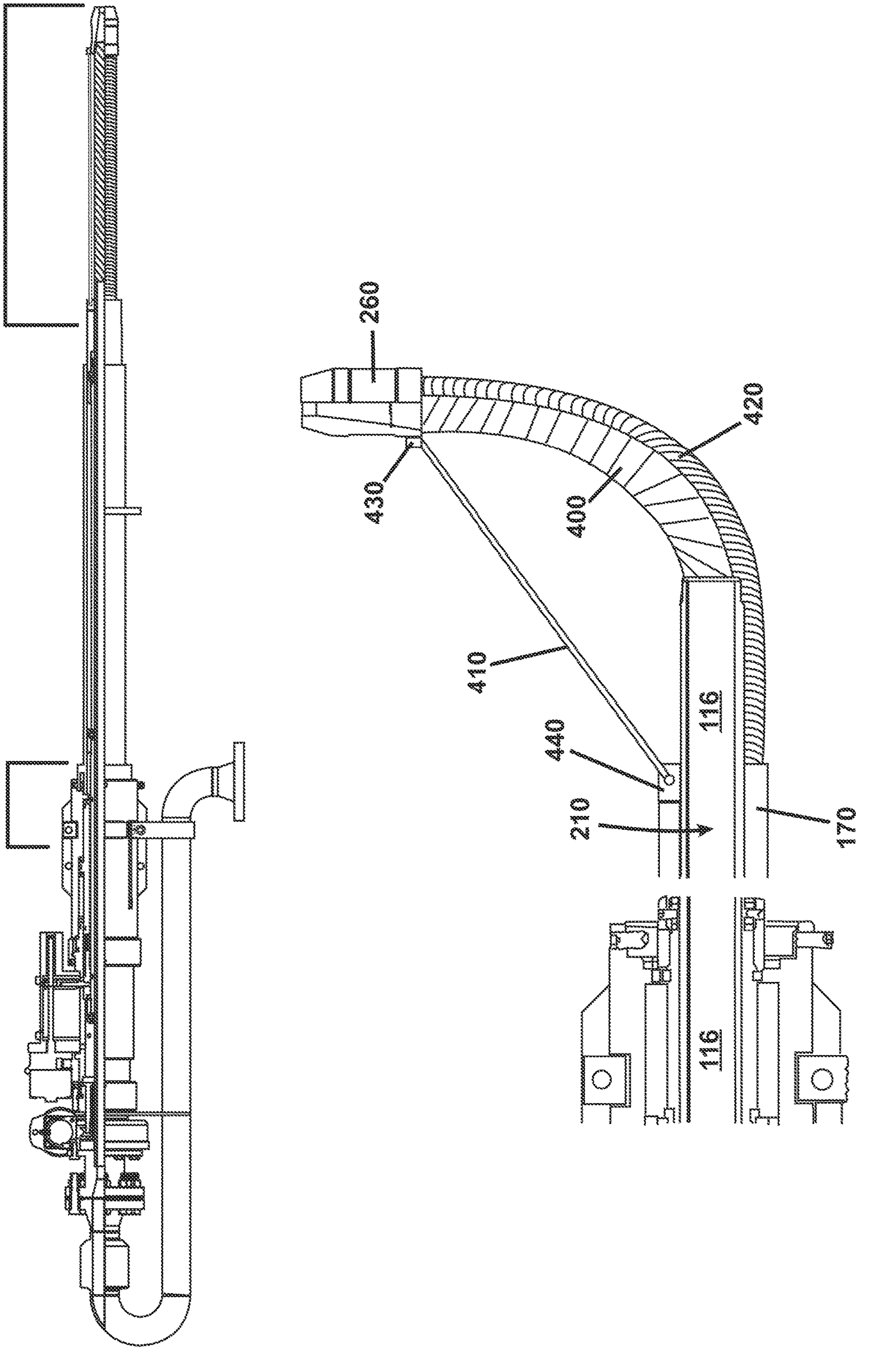
FIG. 8 is a side partial cross-sectional view of an embodiment.

When flexible conduit 400 is in a fully extended linear position (as shown in FIG. 7) and causes nozzle 246 to be substantially in line with primary-fluid-conduit longitudinal axis 112, turning primary fluid conduit 110 about primary-fluid-conduit longitudinal axis 112 has little or no effect on changing the directionality of the pressurized fluid jet being emitted from nozzle tip 260. But when flexible conduit 400 is in a fully retracted position as shown in FIG. 8 (thereby causing nozzle tip 260 to be positioned in at least a 90° angle relative to primary-fluid-conduit longitudinal axis 112) or any other angular position between: i) flexible conduit 400 fully extended linear position (as shown in FIG. 7), and ii) flexible conduit 400 fully retracted position (as shown in FIG. 8), turning primary fluid conduit 110 about primary-fluid-conduit longitudinal axis 112 notably changes the position of nozzle tip 260 and therefore the directionality of the pressurized liquid jet emitted from nozzle tip 260. In embodiments that allow flexible conduit 400 to be in a fully retracted position (as shown in FIG. 8) that is at least a 90° angle relative to a flexible conduit 400 fully extended position (as shown in FIG. 7) of 0°, nozzle tip 260 through controllably turning primary fluid conduit 110 in combination with controllably determining the angle degree (from 0° to >90°) of nozzle tip 260 (as will be further described below) can at least be aimed in substantially any direction within a hemisphere of directions.

Rotational position sensor 240 is configured to monitor the degree of rotation of primary fluid conduit 110 relative to a neutral starting position of 0°. Stated differently, rotational position sensor 240 monitors the degree to which primary fluid conduit 110 has turned in a first or second direction relative to a neutral starting position of 0° (e.g., "+" degree of rotation in a first direction and a "−" degree of rotation in a second opposite direction).

To control the angular position of nozzle tip 260 by retracting flexible conduit 400 from a fully extended position as shown in FIG. 7 (i.e., 0°) to a fully retracted position as shown in FIG. 8 (e.g., >90°) or any angle therebetween (e.g., an angle between a flexible conduit fully extended position (as shown in FIG. 7) of 0° to a fully retracted position as shown in FIG. 8 of >90°) and thereby allow a user to use a remote control to aim nozzle tip 260 (and the pressurized liquid jet emitted therefrom), the following mechanical-configuration explanation of apparatus 100 is provided.

Very generally, extending or retracting flexible conduit 400 (and thereby indirectly altering the angle of nozzle nozzle tip 260) is achieved by retracting or extending penetration sleeve 140 along penetration sleeve linear path 142 thereby indirectly pulling on or releasing tension on pull rod/cable 410 that is fixedly attached to nozzle anchor 430.

As shown in the figures, penetration sleeve 140 is adjacent to and surrounds a majority portion of primary-fluid-conduit exterior surface 172; more specifically, the general section of primary fluid conduit 110 that is positioned inside of adjacent penetration sleeve 140 is generally shown in the figures as section 118. Penetration sleeve 140 is configured to move longitudinally back and forth over primary-fluid-conduit exterior surface 117 along penetration-sleeve linear path 142, and it is this back-and-forth movement of penetration sleeve 140 that causes penetration sleeve 140 to indirectly push or pull on pull rod/cable 410 and thereby alter the position angle of nozzle tip 260 (and the pressurized liquid jet emitted therefrom) to between 0° (as shown in FIG. 7) and in embodiments >90° (as shown in FIG. 8) as desired by a user.

As shown in the figures, piston sleeve 152 is adjacent to and surrounds exterior portion of penetration sleeve first end 144; to be clear, the general section of penetration sleeve 140 that is adjacent to and within piston sleeve 152 is generally shown in the figures as penetration-sleeve section 148. Piston sleeve 152 is housed within piston housing 156. Piston sleeve 152 is fixedly attached to penetration sleeve 140 such that when piston sleeve 152 moves longitudinally back and forth along piston-sleeve linear path 154, penetration sleeve 140 also does so equally. As a non-limiting example, if piston sleeve 152 moves a centimeter in a first direction along piston-sleeve linear path 154, then penetration sleeve 140 also moves a centimeter in the same direction because the two sleeves 152 and 140 are fixedly attached to one another; as one moves, so does the other.

In embodiments, piston sleeve 152 is hydraulically driven back and forth along piston-sleeve linear path 154. Piston-sleeve actuator 161 receives and dispels hydraulic fluid using first-and-second actuator hydraulic fluid ports 164 and 166 to thereby drive piston sleeve 152 back and forth along piston-sleeve linear path 154. linear position sensor 160 monitors the position of piston sleeve 152 along piston-sleeve linear path 154. The indirect effect of controllably moving piston sleeve 152 back and forth along piston-sleeve linear path 154 is that when piston sleeve 152 is in a fully retracted position (and penetration sleeve 140 is also in a fully retracted position), flexible conduit 400 is also in a fully retracted position, and in embodiments results in nozzle tip 260 being positioned at an angle of >90° (relative to nozzle tip 260's position of 0° in fully extended linear position as shown in FIG. 7); likewise when piston sleeve 152 (and penetration sleeve 140) is in a fully extended position, flexible conduit 400 is also in a fully extended position (as shown in FIG. 7) that results in nozzle tip 260 being positioned at an angle of 0°.

Penetration-sleeve second end 146 is fixedly attached to extension sleeve 170. So as penetration sleeve 140 moves back and forth along penetration-sleeve linear path 142, so does extension sleeve 170 to an equal degree. At one of its ends, pull rod/cable 410 is fixedly attached to extension sleeve 170 at extension-sleeve anchor 440. And at pull rod/cable 410's other end, pull rod/cable 410 is fixedly attached to nozzle anchor 430; this connection configuration causes extension sleeve 170 to pull on nozzle anchor 430 as extension sleeve 170 moves towards a retracted position. Likewise, this connection configuration causes extension sleeve 170 to release tension or push on nozzle anchor 430 as extension sleeve 170 moves towards a fully extended position. Pull rod/cable 410 is configured to both release tension from (or push on) and pull on nozzle tip 260 to thereby controllably alter the positional angle of nozzle tip 260 as desired by a user; this is the natural mechanical result of pull rod/cable 410 being fixedly attached to both extension-sleeve anchor 440 and nozzle anchor 430.

As shown in the figures, lead spring with guide cage 420 is positioned underneath flexible conduit 400, and lead spring with guide cage 420 is configured to serve two functions: the first is to provide physical-barrier protection to flexible conduit 400, and the second is to guide flexible conduit 400 back into a resting linear position when there is no tension from pull rod/cable 410 on nozzle tip 260. This first identified function is naturally performed by lead spring with guide cage 420 because in embodiments, lead spring with guide cage 420 has an armadillo-like exterior configuration that provides the desired protection. And the second identified function (i.e., to guide flexible conduit 400 back into a resting linear position when there is no tension from pull rod/cable 410 on nozzle tip 260) is performed by lead spring with guide cage 420 because of: i) its naturally resilient resting-state linear configuration, and ii) because it is fixedly attached to extension-sleeve 170 at one end and to nozzle tip 260 at the other. Because lead spring with guide cage 420 has a resting-state straight linear configuration, and in embodiments it has a spring-like design, lead spring with guide cage 420 will naturally force flexible conduit 400 to return with it to a linear resting position (resulting in a 0° angle of nozzle tip 260) because the spring tension provided by lead spring with guide cage 420 will force flexible conduit 400 to return with it to a resting linear configuration (because both flexible conduit 400 and lead spring with guide cage 420 are fixedly attached to nozzle tip 260; so as nozzle tip 260 moves, so do flexible conduit 400 and lead spring with guide cage 420).

Figure 9:
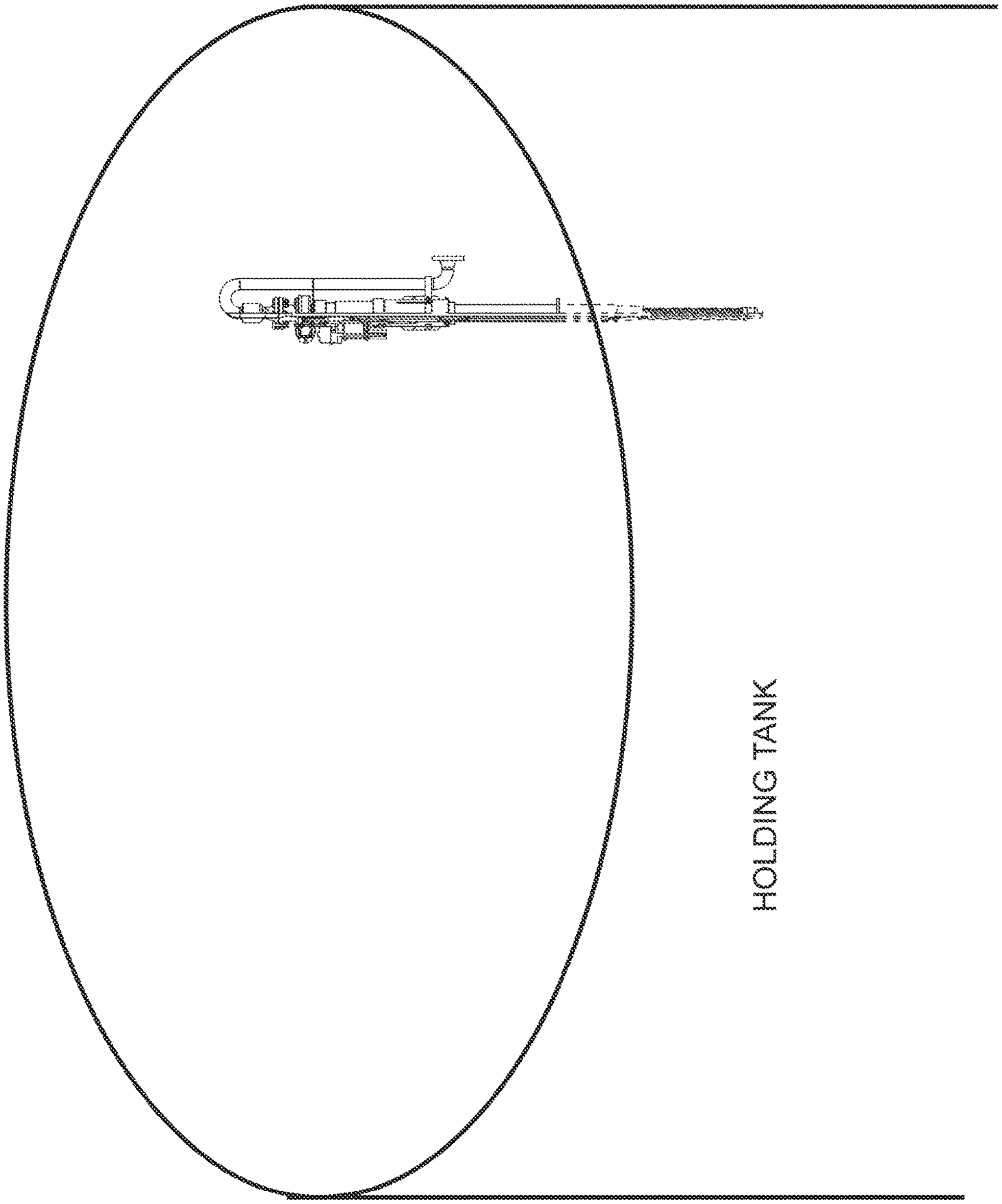
FIG. 9 is a downward-looking side perspective view showing an embodiment mounted on a roof of a holding tank.
Figure 10:
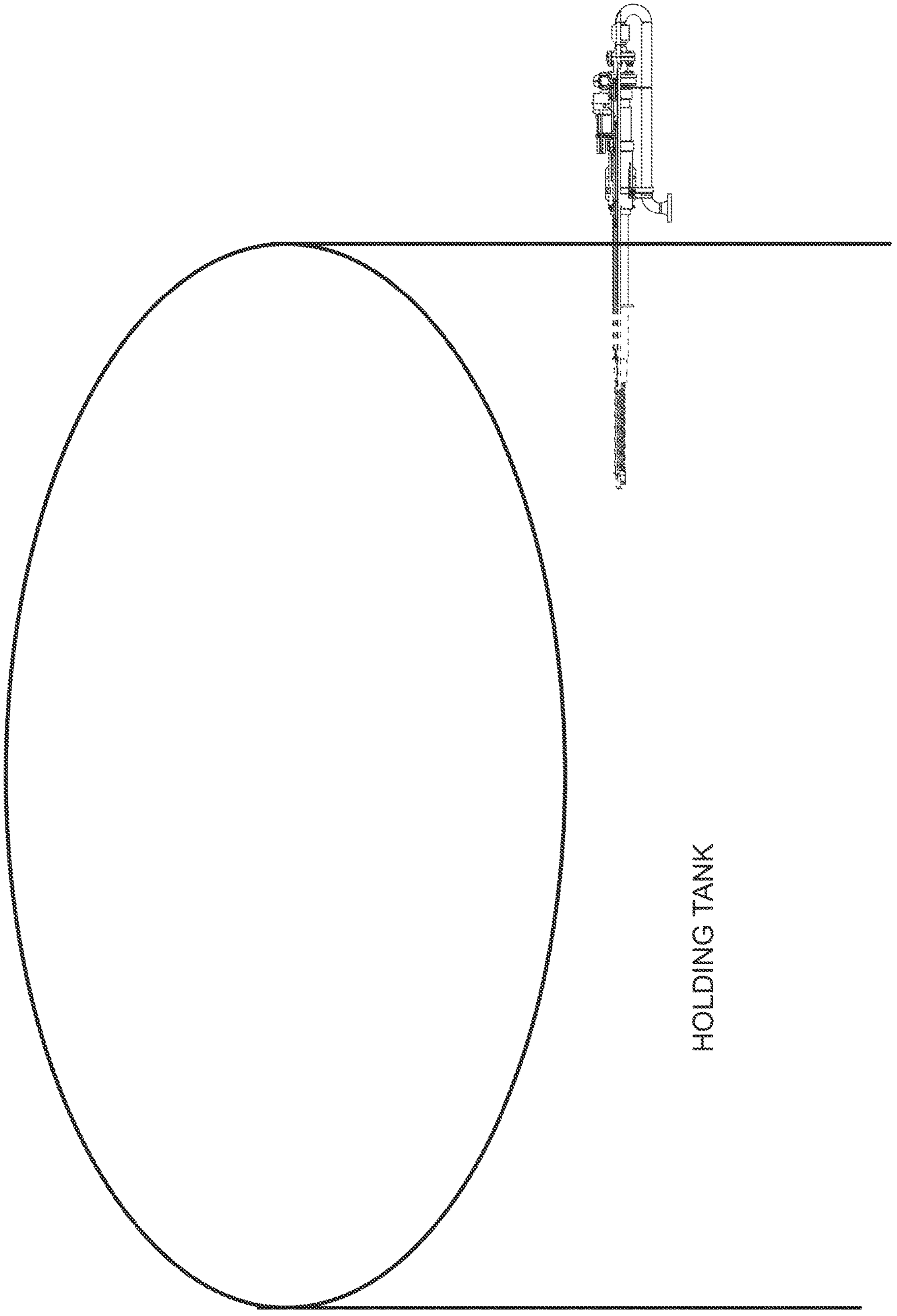
FIG. 10 is a downward-looking side perspective view showing an embodiment mounted on a sidewall of a holding tank.
Figure 11:
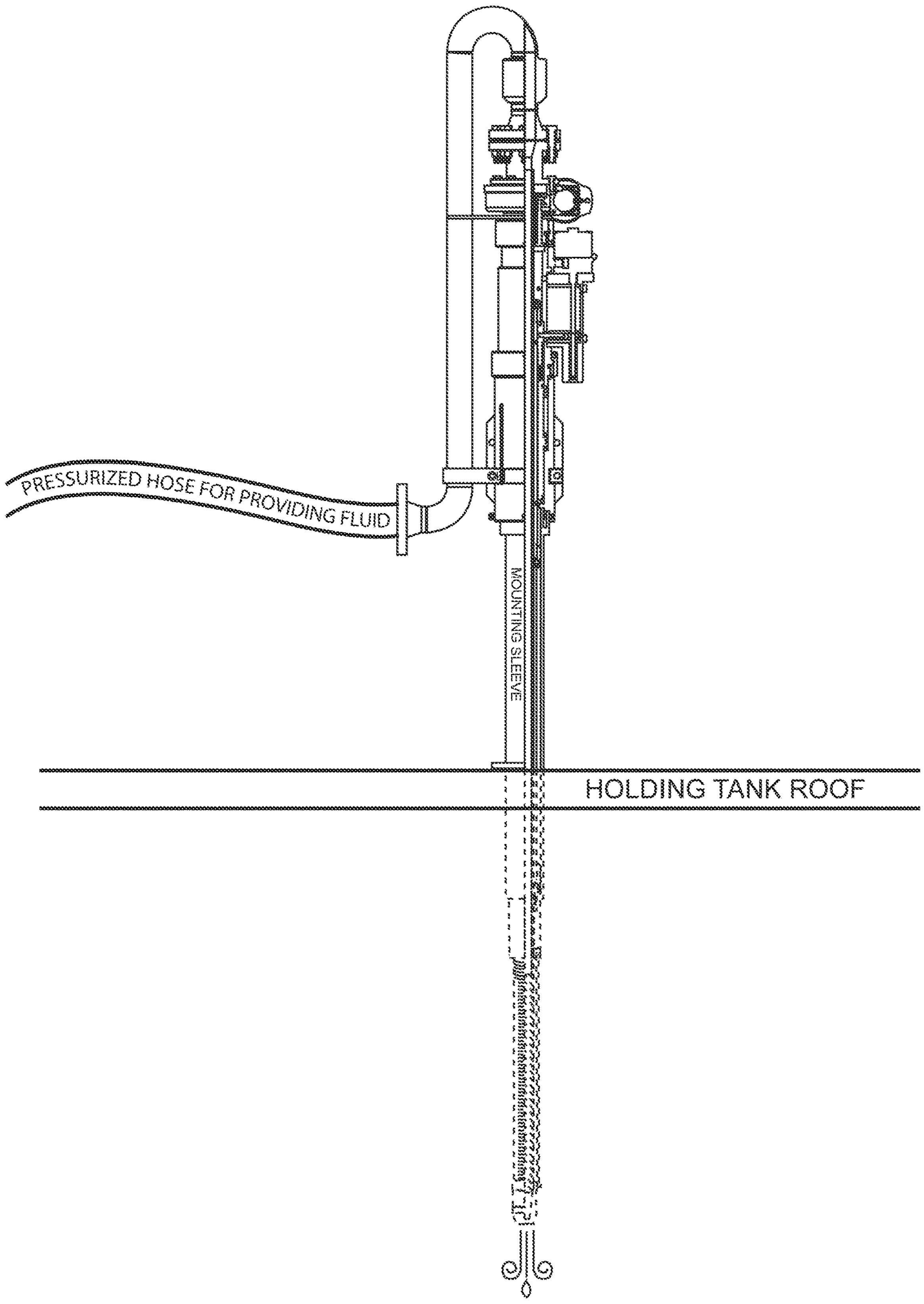
FIG. 11 is a partial cross-sectional side view of an embodiment in use and mounted on a roof of a holding tank.

As shown in FIGS. 9-11, apparatus 100 is configured to be mounted on a holding-tank roof or holding-tank sidewall. As a non-limiting example of how apparatus 100 is configured to be mounted on a holding-tank roof or holding-tank sidewall, the longitudinal length of primary fluid conduit 110 effectively allows nozzle 246 to enter into a holding tank to such a depth that nozzle 246 can effectively be aimed at a holding-tank interior surface for cleaning. And as identified in FIG. 11 as "MOUNTING SLEEVE", a mounting sleeve can be used to introduce apparatus 100 into the interior of a holding tank. Although a mounting sleeve is shown with frequency in the figures, embodiments are directed to apparatus 100 not including a mounting sleeve. Apparatus 100 can be mounted for use in a variety of ways, and use of a mounting sleeve is exemplary of just one embodiment. In another embodiment directed to demonstrating use of apparatus 100, a mounting sleeve separately pre-exits in a holding-tank rooftop or holding-tank sidewall; in those instances, apparatus can simply be inserted into the existing mounting sleeve for use. In other words, in embodiments, a mounting sleeve has been installed in a holding-tank rooftop or holding-tank sidewall, and in those instances, apparatus 100 can simply be inserted into the pre-installed mounting sleeve and used for cleaning purposes.

A controller, shown schematically as a computing system 700 in FIG. 12, can be operatively connected to the first motor 130 and/or the first motor-driven drive assembly 120 to turn primary fluid conduit 110 a desired degree in a first and/or second direction about the primary-fluid-conduit longitudinal axis 112 as described herein. For example, embodiments of the computing system 700 can include electric processing circuitry 702 that executes computer-executable instructions, thereby activating the first motor 130 and/or the first motor-driven drive assembly 120 to turn the primary fluid conduit 110.

The computing system 700 of the embodiment in FIG. 12 is configured and/or programmed with one or more of the exemplary systems and methods described herein, and/or equivalents. As shown, the processing circuitry 702 is responsive to input instructions corresponding to operational states of the first motor 130 and/or the first motor-driven drive assembly 120, to control adjustment of a position, orientation, or other property of the primary fluid conduit 110 and, accordingly, the nozzle tip 260 as described herein. For example, the input instructions can be included as a data structure pre-programmed and stored in a non-transitory, computer-readable medium 706 such as a SD card, hard disk drive, etc.; manually input by an operator during operation of the apparatus 10 via a network device 728 such as a user interface, which can optionally be included as part of the remote control 710, for example; correspond to control signals transmitted by an automated network device 728 such as one or more sensors (e.g., rotational position sensor 240) to be received by the processing circuitry 702, any combination thereof, or otherwise transmitted to the processing circuitry 702. According to other embodiments, the input instructions can include a defined routine that controls the position and/or orientation of the primary fluid conduit to sweep the nozzle tip 260 over a defined range of positions, thereby directing fluid over at least a portion (but less than all), and optionally all of an interior surface of a holding-tank roof and/or holding-tank sidewall.

As an example, the processing circuitry 702 includes a processor 714, an integrated memory 716, and input/output ports 718 controlled by an input/output (I/O) interface 726 operably connected by a data bus 720. Examples of the processor 714 include, but are not limited to single or multi-processor architectures. The processing circuitry 702 can include circuitry of a rotational controller 704 and a nozzle-tip-angle controller 708 that, in conjunction with nozzle positioning logic 722, controls a position and/or orientation of the primary fluid conduit 110 as described herein.

The nozzle positioning logic 722 may be implemented in hardware, a computer-readable medium with stored instructions that are executable by the processor 714, firmware, and/or combinations thereof. While the nozzle positioning logic 722 is illustrated as a hardware component in communication with the rotational controller 704 and the nozzle-tip-angle controller 708, it is to be appreciated that in other embodiments, the nozzle positioning logic 722 could be implemented in the processor 714, stored in memory 716, or stored in a remote computer-readable medium 706 or other electronic storage device that is separate from, but operatively connected to the processing circuitry 702. For embodiments including the remote computer-readable medium 706, the computer-readable medium 706 may be operably connected to the processing circuitry 702 via, for example, an input/output (I/O) interface 726, which includes one or more of the input/output ports 718 (e.g., SD card slot, disc drive, USB port, etc.).

The processing circuitry 702 described above can be integrated with, and form a portion of the apparatus 100, coupled to the apparatus 100 and protected within a weather resistant case, etc. As another example, nozzle positioning logic 722 and/or the processing circuitry 702 can constitute a means (e.g., structure: hardware; non-transitory, computer-readable medium; firmware; etc.) for performing the actions described herein that is remotely located, but operatively connected to the apparatus 100 via a suitable communication channel (e.g., any wireless or hard-wired channel). Examples of such embodiments include, but are not limited to processing circuitry 702 configured as a server or other terminal operating in a cloud computing system, such as a smartphone, laptop, desktop, tablet computing device, and so on, that remotely transmits control instructions to the first motor 130 and/or the first motor-driven drive assembly 120 for controlling the turning of the primary fluid conduit 110, and accordingly, a direction of fluid spray. Such means may be implemented, for example, as an application-specific integrated circuit ("ASIC"), programmed to receive relative or absolute positional data for controlling the primary fluid conduit 110, parse positional data input via the remote control 710 and/or computer-readable medium 706 to generate the corresponding control instruction that, when executed, drives the first motor 130 and/or the first motor-driven drive assembly 120 as described herein. As another example, the means may also be implemented as stored computer-executable instructions that are presented to processing circuitry 702 as data 724 from a remote source over a communication network, that are temporarily stored in memory 716 and then executed by processor 714. Examples of the communication network include, but are not limited to, a local area network ("LAN"), a wide area network ("WAN"), and other networks.

The processing circuitry 702 may interact with one or more of the network devices 728 via the I/O interfaces 726 and the input/output ports 718. Input/output devices may be, for example, any type of user interface that allows an operator to input a command for controlling the position of the nozzle 190. According to some embodiments, examples of the I/O devices 728 include, but are not limited to, a keyboard, a microphone, a pointing and selection device, joystick, cameras, video cards, displays, the computer-readable medium 706, other devices operatively connected to the processing circuitry 702 via a communication network, and so on. The input/output ports 718 may include, for example, serial ports, parallel ports, USB ports, wireless communication channels (e.g., Bluetooth radios, IEEE 802.1x compliant radios, etc).

In one or more embodiments, the disclosed methods or their equivalents are performed by either: computer hardware configured to perform the method; or computer instructions embodied in a module stored in computer-readable medium 706 where the instructions are configured as an executable algorithm configured to perform the present processes when executed by at least a processor of the processing circuitry 702.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" and "memory," as used herein, refer to a non-transitory medium that stores instructions and/or data configured to perform one or more of the disclosed functions when executed by at least a processor. Data may function as instructions in some embodiments. A computer-readable medium 706 and memory 716 may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium 706 and memory 716 may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can retrieve and store data and/or instructions. Each type of media, if selected for implementation in one embodiment, may include stored instructions of an algorithm configured to perform one or more of the disclosed and/or claimed functions.

"Logic," as used herein, represents a component that is implemented with computer or electrical hardware (e.g., computer-readable medium 706 and/or memory 716), a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection," or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

What is claimed is:

1. Apparatus for cleaning a surface with a liquid jet, the apparatus comprising:

a primary fluid conduit having a longitudinal axis and two ends, a fluid-intake end and a fluid-exit end;

a first motor-driven drive assembly configured to engage the primary fluid conduit and turn the primary fluid conduit about the primary-fluid-conduit longitudinal axis;

a first motor configured to engage the first motor-driven drive assembly;

a section of the primary fluid conduit being inside of an adjacent penetration sleeve;

a section of the penetration sleeve being inside of a piston sleeve;

the piston sleeve configured to engage the penetration sleeve and move the penetration sleeve back and forth along a penetration-sleeve linear path over a primary-fluid-conduit exterior surface;

an actuator configured to engage the piston sleeve and move the piston sleeve back and forth along a piston-sleeve linear path;

a penetration-sleeve end being attached to an extension sleeve that has a first end and a second end;

the extension-sleeve second end being attached to a pull rod or a pull cable;

the pull rod or the pull cable being attached to a nozzle anchor and configured to pull on, push against, or release tension from the nozzle anchor as the penetration sleeve moves back and forth along the penetration-sleeve linear path;

the primary-fluid-conduit fluid-exit end being attached to a flexible conduit;

the flexible conduit being attached to a nozzle tip having the nozzle anchor thereon; and a continuous fluid-flow channel that extends from the primary-fluid-conduit fluid-intake end through the flexible conduit.

2. The apparatus of claim 1, further comprising a rotational controller configured to independently rotate the primary fluid conduit about the primary-fluid-conduit longitudinal axis by engaging the first motor, and a nozzle-tip-angle controller configured to independently adjust the angle of the nozzle tip by engaging the actuator.

3. The apparatus of claim 1, wherein the first motor is a hydraulic motor.

4. The apparatus of claim 1, wherein the actuator is a piston actuator.

5. The apparatus of claim 1, wherein the apparatus further comprises a rotational position sensor that is configured to sense a rotational position of the primary fluid conduit.

6. The apparatus of claim 1, further comprising a lead spring with guide cage that is attached to the extension sleeve and the nozzle tip, wherein the lead spring is configured to provide barrier protection to the flexible conduit.

7. The apparatus of claim 6, wherein the lead spring with guide cage is further configured to have spring tension that causes the lead spring with guide cage to be in a resting linear position.

8. The apparatus of claim 1, wherein the continuous fluid-flow channel extends from the primary-fluid-conduit fluid-intake end through the nozzle tip.

9. The apparatus of claim 1, wherein the first motor-driven drive assembly is a gear assembly.

10. The apparatus of claim 1, wherein the actuator is hydraulic.

* * * * *